US010482335B1

(12) United States Patent
Edwards et al.

(10) Patent No.: US 10,482,335 B1
(45) Date of Patent: *Nov. 19, 2019

(54) ATM WITH BIOMETRIC SECURITY

(71) Applicant: Capital One Services, LLC, McLean, VA (US)

(72) Inventors: Joshua Edwards, Philadelphia, PA (US); Michael Mossoba, Arlington, VA (US); Abdelkader Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,078

(22) Filed: Apr. 10, 2019

Related U.S. Application Data

(63) Continuation of application No. 16/029,792, filed on Jul. 9, 2018, now Pat. No. 10,303,963.

(51) Int. Cl.
| | |
|---|---|
| *G06K 9/00* | (2006.01) |
| *G06Q 20/10* | (2012.01) |
| *G06Q 20/40* | (2012.01) |
| *H04N 7/18* | (2006.01) |
| *G06Q 50/26* | (2012.01) |

(52) U.S. Cl.
CPC ...... *G06K 9/00892* (2013.01); *G06Q 20/1085* (2013.01); *G06Q 20/4016* (2013.01); *G06Q 20/40145* (2013.01); *G06Q 50/265* (2013.01); *H04N 7/183* (2013.01)

(58) Field of Classification Search
None
See application file for complete search history.

(56) References Cited

U.S. PATENT DOCUMENTS

| | | |
|---|---|---|
| 5,386,104 A | 1/1995 | Sime |
| 7,505,941 B2 | 3/2009 | Bishop et al. |
| 7,631,193 B1 | 12/2009 | Hoffman |
| 2005/0246291 A1 | 11/2005 | Delgrosso et al. |
| 2009/0119106 A1 | 5/2009 | Rajakumar et al. |
| 2011/0191249 A1 | 8/2011 | Bishop et al. |
| 2012/0233006 A1 | 9/2012 | St. George et al. |

*Primary Examiner* — Matthew C Bella
*Assistant Examiner* — Brian D Shin
(74) *Attorney, Agent, or Firm* — DLA Piper LLP (US)

(57) ABSTRACT

Provided, in an aspect, is a method for improving security in an automated teller machine (ATM) network, which includes prompting a user, via the ATM, to provide a biometric sample; receiving the sample from a biometric device of the ATM; determining that the sample is not blacklisted; and allowing the user to complete a transaction. Because the method includes storing anonymized event details, which include the biometric sample separate from user-identifying information, the method both improves privacy for law-abiding users and deters malicious use by others.

20 Claims, 3 Drawing Sheets

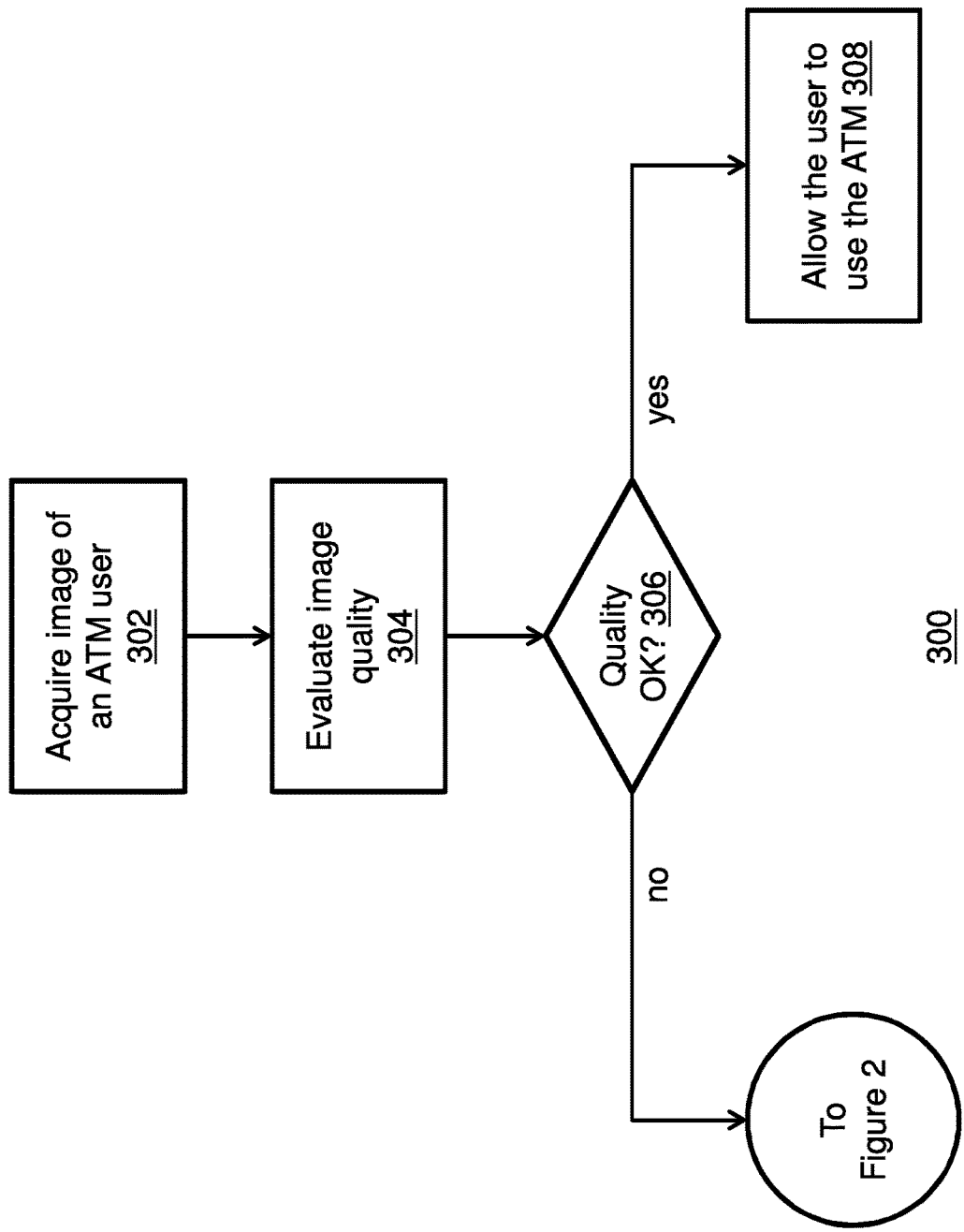

ATM WITH BIOMETRIC SECURITY

CROSS-REFERENCE TO RELATED APPLICATIONS

This is a continuation of U.S. application Ser. No. 16/029,792, filed Jul. 9, 2018, the content of which is hereby incorporated by reference in its entirety.

BACKGROUND

Automated teller machines (ATMs) may include one or more security features to protect customers against malicious use of stolen or counterfeit access cards (e.g., debit or credit cards used to withdraw money from an ATM). For example, some ATMs include a camera positioned to capture images or video of persons using the ATM. Stored images or video can be later reviewed to identify and prosecute malicious users. However, a malicious user may be able to subvert existing camera-based security systems, for example by wearing a ski mask.

SUMMARY

In an aspect of the present disclosure, a method for improving security in an automated teller machine (ATM) network includes receiving a transaction request from a user at an ATM; prompting the user, via the ATM, to provide a biometric sample; receiving the biometric sample of the user from a biometric device of the ATM; determining that the biometric sample is not blacklisted by communicating with a server configured to compare the biometric sample against biometric sample information stored within a blacklist database; and allowing the user to complete the transaction in response determining that the biometric sample is not blacklisted. In this aspect, the server is configured to, in response to the transaction being completed, store anonymized event details including a location of the transaction, a date and time of the transaction, an amount for the transaction, and the biometric sample, wherein the anonymized event details do not include information associated with the user. In other words, the event details are tied to the transaction, and not to the identity of the user.

In some embodiments of the method, also included is determining that the biometric sample has a quality level that passes a predetermined threshold. The quality level may pass a threshold when it is higher than a threshold if levels are defined so that higher levels are better, and when it is lower than a threshold if levels are defined so that lower levels are better. Whatever mathematical attributes the threshold may have, passing that threshold means that the quality level of the sample is acceptable. In some embodiments, the method allows a maximum number (e.g., 1, 2, 3, 4, 5, 6) of attempts before denying the use of the ATM. For example, if the maximum number of attempts allowed is three, the method may include determining that the biometric sample has a quality level that passes a predetermined threshold after receiving two prior biometric samples with insufficient quality after the transaction request. The biometric sample may be a face scan, iris scan, retina scan, fingerprint, palm print, hand vein pattern, finger geometry, voice profile, signature, or ear scan. In some embodiments, the biometric sample is not used for identifying the user before allowing the user to complete the transaction. The biometric sample may be stored separately from a transaction log that includes user-identifying information. For example, the transaction log may have information about user identities and no biometric information, while a separate database of event details may have information about the transaction and the biometric sample but no user identities.

In some embodiments, the method includes, in response to determining at a later time that the transaction was fraudulent, providing the biometric sample to a law enforcement agency. The method may include, in response to determining that the transaction increases a ratio of a number of transactions per biometric sample for the biometric sample beyond a predetermined ratio, updating the blacklist database to include the biometric sample in the blacklist database. In some embodiments, the method includes, before prompting the user for a biometric sample, acquiring an image of the user and determining that the image quality is poor. If the image quality is not poor, then the ATM may, in some embodiments, allow the use of the ATM without requiring a biometric sample.

In some embodiments, the blacklist database includes a database such as an agency database, a customer database, a bank database, or a combination of such databases. The agency database may include matches for biometric samples that have been reported by one or more law enforcement agencies. The customer database may include matches for biometric samples that are associated with fraudulent transactions reported by one or more customers. The bank database may include matches for biometric samples that have been flagged by one or more banks. A "bank" as used herein refers generally to financial service providers. A bank or a law enforcement agency may report or flag a biometric sample directly, or may report or flag a transaction (e.g., as fraudulent) after which the associated biometric sample may be entered into the blacklist database.

In an aspect of the present disclosure, an automated teller machine for improving security of a transaction includes a biometric sensor for receiving a biometric sample from a user; a processor; and a non-transitory computer-readable medium. The non-transitory computer-readable medium, in this aspect, stores instructions executable by the processor to prompt the user to provide a biometric sample; receive the biometric sample of the user by using the biometric sensor; evaluate a biometric quality value for the biometric sample; determine that the biometric quality value is acceptable; determine that the biometric sample is not blacklisted by communicating with a server configured to compare the biometric sample against biometric sample information stored within a blacklist database; and allow the user to complete the transaction in response determining that the biometric sample is not blacklisted. In this aspect, the server is configured to, in response to the transaction being completed, store anonymized event details including a location of the transaction, a date and time of the transaction, an amount for the transaction, and the biometric sample, wherein the anonymized event details do not include information associated with the user.

In some embodiments of the ATM, the biometric sample includes a face scan, iris scan, retina scan, fingerprint, palm print, hand vein pattern, finger geometry, voice profile, signature, handwriting sample, or ear scan. The server, in some embodiments, may be configured to store the biometric sample separately from a transaction log that comprises user-identifying information. The ATM may include the non-transitory computer-readable medium storing instructions executable by the processor to, before any prompt to the user for a biometric sample, acquire an image of the user via a camera, and determine that the image has an unacceptable image quality. The blacklist database can be remote to the ATM. The biometric sample may be blacklisted when it is matched in at least one of an agency database, a customer database, and a bank database, which in some embodiments may be separate from each other or may be merged with each other into one database.

In one aspect of the present disclosure, a method for improving security at an ATM includes acquiring an image of an ATM user via a camera of the ATM; determining that a face cannot be recognized in the image (e.g., by calculating an image quality score for the image using pattern recognition analysis, and determining that the image quality score is poor); determining that the user requests a transaction at the ATM; prompting the user to provide a biometric sample; receiving the biometric sample of the user from a biometric device of the ATM; evaluating a biometric quality score for the biometric sample; determining that the biometric quality score passes a predetermined threshold; determining that the biometric sample is not blacklisted by communicating with a server configured to compare the biometric sample against biometric sample information stored within at least one biometric blacklist database; and allowing the user to complete the transaction in response determining that the biometric sample is not blacklisted. In this aspect, the server is configured to, in response to the transaction being completed, store anonymized event details including a location of the transaction, a date and time of the transaction, an amount for the transaction, and the biometric sample, wherein the anonymized event details do not include information associated with the user. In some embodiments, after acquiring an image of an ATM user via a camera of the ATM and before prompting the user to provide a biometric sample, the method may determine that a face cannot be recognized in the image.

The embodiments described above have various advantages. For example, because of the requirement for a biometric sample, they discourage malicious users from using ATMs. They also help law enforcement agencies when there is an improper ATM use by making it easier to track the wrongdoers. In addition, because the biometric samples are kept separate from user-identities, the embodiments promote privacy of users as long as the users use the ATMs properly, since their biometric samples are not linked to their identities.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 3 is a flow diagram showing processing that may occur within the ATM network of FIG. 1, according to some embodiments of the present disclosure.

DETAILED DESCRIPTION

According to some embodiments of the present disclosure, systems and methods can improve security in an ATM using biometrics. In some embodiments, a biometric sample of an ATM user may be required prior to allowing the user to complete a transaction, such as withdrawing money. In some embodiments, if a clear facial image of a user is already available, for example from an ATM camera, then a biometric sample may not be required. In some embodiments, biometric samples may be stored in association with the transaction but without any user-identifying details. The systems and methods disclosed herein may improve the security of ATMs without compromising user privacy.

Figure 1:
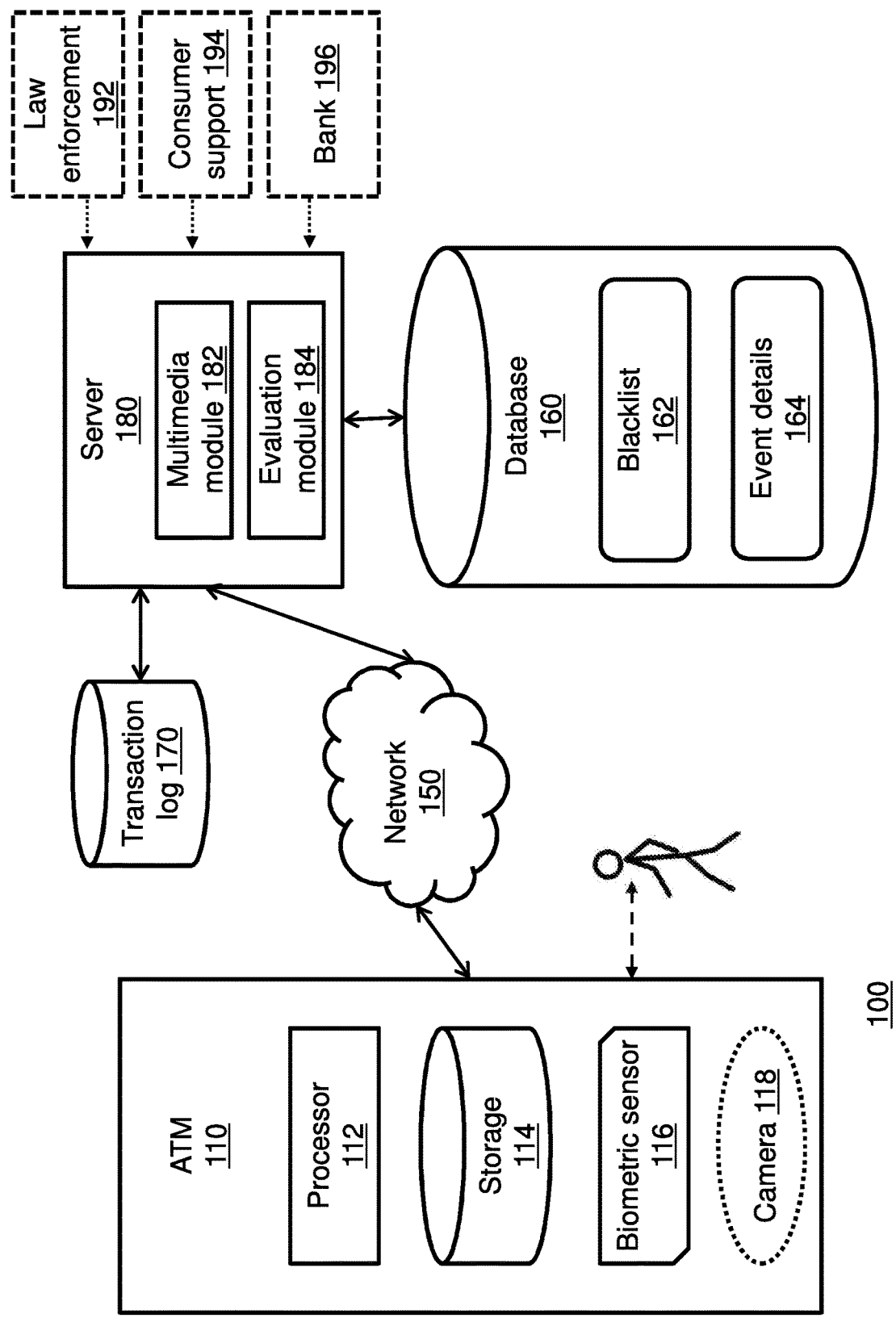
FIG. 1 is a diagram of an illustrative automated teller machine (ATM) network, according to some embodiments of the present disclosure.

FIG. 1 shows an ATM network with improved security, according to some embodiments of the present disclosure. The illustrative ATM network 100 can include ATM 110, database 160, transaction log 170, and server 180. ATM 110 can be coupled to server 180 via network 150 (e.g., ATM 110 can be coupled to a host computer through a telephone network and the host computer can be connected to server 180 through a telephone network). Database 160 and transaction log 170 may be coupled to server 180 via one or more wireless or wired computer networks or direct connections. Server 180 may be configured to receive information from one or more external computer systems, such as law enforcement 192, consumer support 194, and bank 196. A "bank" as used herein refers generally to financial service providers. In some embodiments, server 180 may be configured to receive information from multiple banks, multiple consumer supports, and/or multiple law enforcement sources. In some embodiments, ATM network 100 may include a plurality of servers 180 and/or a plurality of ATMs 110, with each ATM configured to communicate with one or more servers and each server configured to communicate with one or more ATMs. In some embodiments, ATM network 100 can include a plurality of databases 160 and/or transaction logs 170. The various components of ATM network 100 may be connected as shown in FIG. 1, or in any other suitable manner.

ATM 110 may include various components of known ATM devices, and may include at least one processor 112, storage 114, and biometric sensor 116. ATM 110, in some embodiments, may also include camera 118. Camera 118 may be physically coupled to ATM 110, or it may be physically detached from ATM 110. In some embodiments, biometric sensor 116 may also function as the camera. The ATM may include hardware (e.g., touchscreen device, buttons) and software to receive input from and to display user interfaces to a user.

Storage 114 may store software, such as an operating system and/or applications, for ATM 110 to function. Storage 114, in some embodiments, does not include any transaction data or any biometric samples. In some embodiments, storage 114 may temporarily store transaction data and/or a biometric sample until such information is transmitted to server 180.

Biometric sensor 116 may include any known device that is configured to acquire a biometric sample. Examples include retina scanners, facial imaging cameras, and fingerprint acquirers. In some embodiments, biometric sensor 116 may use facial recognition, iris scanning, retina scanning, fingerprint acquiring, palm print taking, hand vein imaging, finger geometry capturing, voice recognition, signature acquiring, or ear imaging. Various models of biometric sensor 116 may be obtained from commercial manufacturers, such as HID, Suprema, Nitgen, Crossmatch, SecuGen, 3M Cogent, Fujitsu, NEC, BioEnable Technologies, ImageWare Systems, M2SYS, Mobbeel, Precise Biometrics, or SIC Biometrics. Many other kinds of biometric sensors, from the provided sources or other sources, may also be deployed for ATM 110.

Server 180 may include multimedia module 182 and evaluation module 184. Multimedia module 182 may process biometric samples (e.g., receive, send, standardize, convert). For example, multimedia module 182 may receive a biometric sample transmitted from ATM 110. The biometric sample may be a face scan, retina scan, fingerprint scan, or any other sample that can reliably and accurately identify an individual out of many other (e.g., 1 out of 1 million) individuals. The biometric sample may be in the form of a 1D array or a 2D (or a higher-dimensional) matrix, and may store intensity values for a set of pixels. The biometric sample may also store color information (e.g., CMYK, RGB). Once multimedia module 182 receives the biometric sample, it may perform various operations on it. For example, it may perform down-sampling or smoothing to improve further processing of the sample. It may also perform standardization, for example by converting the color profile of a sample to a chosen standard color profile. Once multimedia module 182 processes the biometric sample(s), it may send them to database 160 for storage and/or it may send them to evaluation module 184 for additional processing.

Evaluation module 184 may provide a quality determination for the biometric samples. The quality determination may include determining a quality score or another quantitative value, and then comparing that score or value to a threshold score or value. Evaluation module 184 may receive a biometric sample from multimedia module 182. Evaluation module 184 may receive a biometric sample from ATM 110. Once evaluation module 184 receives a biometric sample, it may use different techniques to determine quality of different types of biometric samples (e.g., face scan, retina scan, or fingerprint). In some embodiments, evaluation module 184 may use the same technique to determine sample quality for different samples. As an example, for a face scan, evaluation module 184 may perform pattern matching and/or feature detection to determine locations of facial features, and then determine a quality score for the face scan based on the deviations from typical human facial feature patterns. In one particular example, evaluation module may be configured to recognize 80 nodal points (i.e., end points) on a user's face, such as length of nose, width of nose, cheekbone shape, and eye socket depth. The captured data for the nodal points may be saved as a face print, which may be three-dimensional. In some embodiments, evaluation module 184 may determine various parameters, such as distances between features on a face (e.g., the two eyes) and ratios between various distances (e.g., face length to face width). In some embodiments, patterns of the iris may be analyzed for determining quality. In some embodiments, ATM 110 may require multiple biometric samples in order to ensure good quality, and in some embodiments, may provide instructions to the user to improve sample quality (e.g., to stand at a certain distance, such as 4-13" from the sensor, for iris scanning). For the example of iris scanning, an acquired image may be processed to separate the main iris patterns from the inner and outer boundaries of the iris, and then the iris patterns may be encoded into a code, such as a 512-bit code, which may then be used for matching and pattern recognition against other iris codes from a standard database.

Transaction log 170 is configured to store user-identifying transaction data (e.g., name, account number). In contrast, database 160 is configured to store anonymized transaction details and biometric samples without any user identifying information.

Database 160 may include blacklist 162 and event details 164. Blacklist 162 may store biometric samples that have been blacklisted. Event details 164 may store received biometric samples along with the transactions for which they were received. In some embodiments, server 180 may include an application programming interface (API) via which ATM 110 can issue various requests disclosed herein.

Database 160 may include non-volatile memory configured to store data for blacklist 162 and event details 164. In some embodiments, database 160 may include a relational database having one or more tables to store the blacklists and event details. Some of the stored attributes may be singular values (e.g., $10, for a withdrawal amount stored in event details), while some may be one or multi-dimensioned arrays (e.g., a 1D, 2D, or a higher-dimensional matrix for storing a retinal scan as a biometric sample).

Blacklist 162 may store biometric samples that have been blacklisted. For example, blacklist 162 may include a list of fingerprint images that have previously been associated with suspicious or malicious activity. Blacklist 162 may store multiple types of biometric samples (e.g., face scans, retina scans, fingerprints). Blacklist 162 may be created, populated, or extended with information from multiple sources. For example, law enforcement 192 may provide information about biometric samples that have been associated with fraudulent activity. Similarly, bank 196, which may be the same bank that controls ATM 110 or another bank, may provide information that certain biometric samples are associated with malicious activity. This may be done, for example, by determining the ratio of the number of accounts attempted to be accessed by using the same biometric sample. If that ratio is higher than a certain number (e.g., it would be unlikely for a user to have 15 accounts), then a bank may automatically blacklist a certain biometric sample. In addition, users may report transactions that have not been authorized; as such, consumer support 194 can be another source for creating blacklist 162 (e.g., through addition of the biometric samples associated with the reported transactions). Blacklist 162 may be created from one or multiple of these sources, and it may be updated in real time or through various intervals (e.g., nightly).

Event details 164 may store information about transactions that occur within the ATM network 100 in an anonymous manner, meaning the stored data generally cannot be used to identify specific users or accounts associated with each transaction. Event details 164 may also store biometric samples that are received during transactions. For example, if a withdrawal transaction occurs within ATM network 100, event details 164 may store the date and time of the transaction, the amount of the transaction, the place of the transaction, and one or more biometric samples received in association with the transaction. Event details 164 may receive anonymized transaction data and biometric samples from server 180. A skilled artisan will understand that the data stored in event details 164 can be used to investigate or prosecute malicious use of ATM 110 without compromising user privacy.

Because event details 164 may store information about both the transaction and the biometric sample, when there is a report of a fraudulent transaction (e.g., from a user calling consumer support 194 to report an unauthorized transaction), it would be possible to determine the associated biometric sample by searching for the transaction details (e.g., transaction location, transaction time, transaction amount) in event details 164, since event details 164 links transaction information to biometric samples. Therefore, while event details 164 may not store user-identifying information the way transaction log 170 may, event details may still store transaction information (e.g., date, time, location, amount).

A user may use ATM 110 by presenting an access card or "card" (e.g., through a slot of the ATM) and providing input to ATM 110. In some embodiments, a user may use ATM 110 by using a contactless card or a phone. In some embodiments, ATM 110 may (e.g., by default) prompt the user for a biometric sample, and once ATM 110 receives the sample, ATM 110 may transmit the sample to server 180. As such, server 180 may receive a request from ATM 110 for determining whether the transaction should be allowed. Server 180 may process the biometric sample at multimedia module 182 and/or evaluation module 184 to determine its quality. After a predetermined number of allowed attempts (e.g., 1, 2, 3, 4, 5, 6), if no biometric sample with acceptable quality has been received by server 180, server 180 may return a response to ATM 110 to deny the user the use of ATM 110. If server 180 determines that biometric sample quality is OK, it may also determine if the sample is blacklisted by comparing it against blacklist 162. In such embodiments, server 180 may determine both whether sample quality is OK and whether the sample is blacklisted. In some embodiments, some portions of the method may happen in ATM 110, instead of in server 180. As an example, processing and evaluating the biometric sample to determine whether its quality is OK may occur within ATM 110, such as through execution of instructions stored in storage 114 by processor 112. In some embodiments, ATM 110 may include camera 118. Camera 118 may acquire an image (e.g., facial image) of the user. ATM 110 may send a request to server 180 with the image, and server 180 may process the image in multimedia module 182 and/or evaluation module 184 to determine whether a face can be recognized and/or to determine its quality. If the quality is OK, server 180 may return a response to ATM 110 to allow the user to use ATM 110. If the quality is not OK (e.g., after one attempt, after N attempts), or if the request from ATM 110 does not include an image, server 180 may return a response to ATM 110 to require a biometric sample from the user. In some embodiments, ATM 110 may perform quality assessment of the image of the user in order to determine whether a biometric sample should be required. When a biometric sample is required (e.g., by default, due to a response from server 180, due to a determination by ATM 110), ATM 110 may prompt the user for a biometric sample, and after receiving the biometric sample, may transmit it to server 180. Server 180 may handle the biometric sample as explained for some embodiments (e.g., process at multimedia module 182 and/or evaluation module 184 to determine quality, determine if blacklisted by comparing against blacklist 162). In some embodiments, the evaluation of biometric sample may happen within ATM 110, for example through execution of instructions stored in storage 114 by processor 112. In such embodiments, ATM 110 may send a request to server 180, after determining that its quality is OK, to determine if the sample is blacklisted, and server 180 may compare the biometric sample against blacklist 162 to determine if it is blacklisted. Once server 180 determines that the biometric sample (with acceptable quality) is not blacklisted, then it may return a response to ATM 110 to allow the user to use ATM 110. If the sample is blacklisted, server 180 may return a response to ATM 110 to deny the user any use of ATM 110. In some embodiments, database 160 would store the biometric sample and anonymized transaction details in event details 164. User-identifying transaction data may be stored in transaction log 170. Server 180 may transmit the appropriate information to the appropriate storage component (e.g., user-identifying information to transaction log 170; anonymized transaction data and biometric samples to event details 164).

Figure 2:
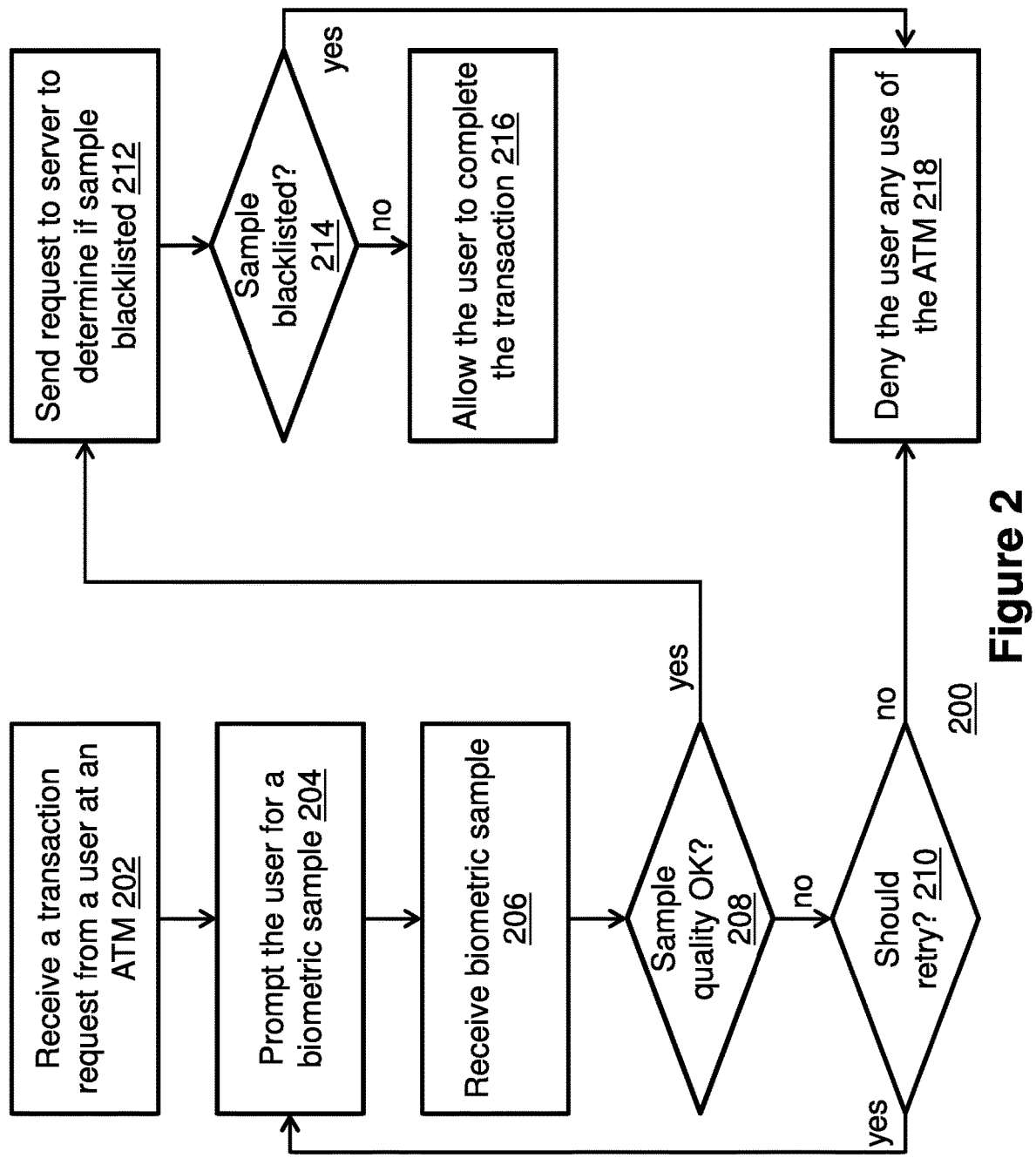
FIG. 2 is a flow diagram showing processing that may occur within the ATM network of FIG. 1, according to some embodiments of the present disclosure.

FIG. 2 shows method 200 for improving security in an ATM network, according to some embodiments of the present disclosure. Method 200 may be implemented within an ATM, such as ATM 110 shown in FIG. 1. At block 202, a transaction request may be received from a user at an ATM, after which the user may be prompted for a biometric sample at block 204. If the user does not provide a biometric sample, the ATM may deny the user any use of the ATM. Once the user provides a biometric sample, it may be received at block 206, and the method may determine whether its quality is OK at block 208. If the sample quality is not OK, at block 218 the method may include denying the user any use of the ATM. In some embodiments, the method may allow the user a certain maximum number of attempts (e.g., 1, 2, 3, 4, 5, 6). For example, when a maximum number of N attempts are allowed by the method, then after finding the sample quality to be not OK at block 208, the method may determine at block 210 whether prompting the user for a biometric sample should be retried by determining whether the number of failed attempts is less than N. If the number of failed attempts (i.e., those for which sample quality has been not OK) reaches N, then the method may deny the user any use of the ATM at block 218. If the sample quality is OK, at block 212 the method may send a request to a server, such as server 180 shown in FIG. 1, to determine if the sample is blacklisted. If the sample is backlisted, at block 218 the method may deny the user any use of the ATM. Otherwise, if the sample is not blacklisted, at block 216 the method may allow the user to complete the transaction.

FIG. 3 shows a method for improving security at an ATM, according to some embodiments of the present disclosure. Method 300 may be implemented within an ATM, such as ATM 110 shown in FIG. 1. At block 302, an image of a user may be acquired, for example using camera 118 of ATM 110. The camera may be the same as the biometric sensor, such as sensor 116 shown in FIG. 1, or it may be a separate camera, such as camera 118 shown in FIG. 1. At block 304, the quality of the image may be determined. If the image quality is OK as determined at block 306, then at block 308 the method may allow the user to use the ATM without requiring a biometric sample. This may happen, for example, if the user had an unobscured face and the camera was able to acquire a clear facial image of the user. On the other hand, if the image quality is not OK at block 306, then the method may fall back into method 200 shown in FIG. 2. In some embodiments, instead of determining image quality, the method may determine whether a face can be recognized in the image. If the user had already requested a transaction, the method of FIG. 2 may continue from block 204. If the image quality determination of block 306 had been done before any request by a user, then the method of FIG. 2 may continue from block 202. A variety of software and algorithms may be used to achieve face recognition or detection. For example, as a case of object-class detection, the algorithm may test the valley regions to detect eye regions, and it may use a genetic algorithm to detect eyebrows, iris, nostrils, mouth corners, or other face regions. Many face candidates may be generated, then each may be normalized to reduce light and shirring effects, and their fitness may be measured based on their projection on Eigen-faces. Face symmetries may be measured and existence of different facial features may be verified for the face candidates. Overall, an algorithm may look for eyes, nose, eyebrows, etc., to determine if there is a face in the image. The method may determine that there is no face in the image if the user avoids looking at the camera, if the user obscures his/her face, or if the user covers the camera. In some embodiments, the method may do a full facial recognition and run it against the blacklist database before determining whether to go to the method outlined in FIG. 2.

Methods described herein may represent processing that occurs within an automated teller machine network, such as ATM network 100 shown in FIG. 1. The subject matter described herein may be implemented in digital electronic circuitry, in computer software, in firmware, or in computer hardware, including the structural means disclosed in this specification and their structural equivalents. The subject matter described herein can be implemented as one or more computer program products, such as one or more computer programs tangibly embodied in an information carrier, such as a machine-readable storage device, for execution by or control of the operation of data processing apparatus, such as programmable processor or one or more computers. A computer program, software, application, or code can be written in any form of programming language (e.g., compiled, interpreted) and it can be deployed in any form (e.g., stand-alone program, module, component, subroutine, other unit suitable for use in computing environment). A computer program need not correspond to a file, can be stored in a portion of a file, can be stored in a single dedicated file, or can be stored across multiple files. A computer program can be deployed to be executed on one computer or on multiple computers at one site or can be distributed across multiple sites (e.g., as interconnected by a communication network).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, such as a field programmable gate array or an application specific integrated circuit.

Processors suitable for the execution of a computer program include both general and special purpose microprocessors, as well as any one or more processors of any kind of digital computer. Generally, a processor will receive instructions and data from a read-only memory, a random-access memory, or both. The standard elements of a computer are a processor for executing instructions and one or more memory devices for storing instructions and data. Generally, a computer will also include, and/or be operatively coupled to receive data from or transfer data to, one or more mass storage devices for storing data, such as magnetic disks, magneto optical disks, or optical disks. Information carriers suitable for embodying computer program instructions and data include all forms of nonvolatile memory, including semiconductor memory devices such as EPROM, EEPROM, flash memory devices, and magnetic disks. The processor and the memory can be supplemented by or incorporated in special purpose logic circuitry.

The disclosed subject matter is not limited in its application to the details of construction and to the arrangements of the components set forth in the specification or illustrated in the drawings. The disclosed subject matter is capable of being implemented in other embodiments and of being practiced and carried out in various ways. Those skilled in the art will appreciate that the conception, upon which this disclosure is based, may be described using different phraseology and terminology and may readily be utilized as a basis for the designing of other structures, methods, and systems for carrying out the several purposes of the disclosed subject matter.

Although the disclosed subject matter has been described and illustrated by way of example in the foregoing exemplary embodiments, numerous changes in the details of the implementation of the disclosed subject matter may be made without departing from the spirit and scope of the disclosed subject matter.

What is claimed is:

1. A computer-implemented method for improving security in an automated teller machine (ATM) network comprising a plurality of ATM devices, the method comprising
   receiving, at an ATM device of the ATM network, a transaction request from a user associated with a user-identifying information;
   prompting the user, via the ATM device, to provide a biometric sample;
   receiving, through a biometric sensor of the ATM device, the biometric sample of the user;
   determining, by the ATM device, that the biometric sample is not blacklisted by communicating with a server configured to compare the received biometric sample against biometric sample information stored within a blacklist database; and
   allowing the user to complete, by the ATM device, the transaction associated with the user in response to determining that the biometric sample is not blacklisted,
   wherein the server is configured to store anonymized event details comprising a location of the transaction, a date and time of the transaction, an amount for the transaction, and the biometric sample, wherein the anonymized event details include information different from the user-identifying information associated with the user completing the transaction on the ATM device.

2. The computer-implemented method of claim 1, comprising determining that the biometric sample has a quality level that passes a predetermined threshold.

3. The computer-implemented method of claim 1, comprising determining that the biometric sample has a quality level that passes a predetermined threshold after receiving one or more prior biometric samples with insufficient quality after the transaction request.

4. The computer-implemented method of claim 1, wherein the biometric sample is selected from the group consisting of a face scan, iris scan, retina scan, fingerprint, palm print, hand vein pattern, finger geometry, voice profile, signature, and ear scan.

5. The computer-implemented method of claim 1, wherein the biometric sample is not used for identifying the user before allowing the user to complete the transaction.

6. The computer-implemented method of claim 1, wherein the biometric sample is stored separately from a transaction log that comprises user-identifying information.

7. The computer-implemented method of claim 1, comprising, in response to determining at a later time that the transaction was fraudulent, providing the biometric sample to a law enforcement agency.

8. The computer-implemented method of claim 1, comprising, in response to determining that the transaction increases a ratio of a number of transactions per biometric sample for the biometric sample beyond a predetermined ratio, updating the blacklist database to include the biometric sample in the blacklist database.

9. The computer-implemented method of claim 1, comprising, before prompting the user for a biometric sample, acquiring an image of the user and determining that the image quality is poor.

10. The computer-implemented method of claim 1, wherein the blacklist database comprises a database selected from an agency database, a customer database, a bank database, and a combination thereof.

11. The computer-implemented method of claim 10, wherein the agency database comprises matches for biometric samples that have been reported by law enforcement agencies.

12. The computer-implemented method of claim 10, wherein the customer database comprises matches for biometric samples that are associated with fraudulent transactions reported by customers.

13. The computer-implemented method of claim 10, wherein the bank database comprises matches for biometric samples that have been flagged by a bank.

14. An automated teller machine (ATM) with improved security, the ATM comprising:
a biometric sensor for receiving a biometric sample from a user associated with a user-identifying information;
a processor; and
a non-transitory computer-readable medium storing instructions executable by the processor to:
prompt the user to provide a biometric sample;
receive the biometric sample of the user from the biometric sensor;
evaluate a biometric quality value for the biometric sample;
determine that the evaluated biometric quality value is acceptable;
determine that the biometric sample is not blacklisted by communicating with a server configured to compare the received biometric sample against biometric sample information stored within a blacklist database; and
allow the user to complete the transaction associated with the user in response to determining that the biometric sample is not blacklisted,
wherein the server is configured to store anonymized event details comprising a location of the transaction, a date and time of the transaction, an amount for the transaction, and the biometric sample, wherein the anonymized event details include information different from the user-identifying information associated with the user completing the transaction on the ATM device.

15. The ATM of claim 14, wherein the biometric sample comprises a face scan, iris scan, retina scan, fingerprint, palm print, hand vein pattern, finger geometry, voice profile, signature, and ear scan.

16. The ATM of claim 14, wherein the server is configured to store a transaction log that comprises user-identifying information separately from the biometric sample.

17. The ATM of claim 14, wherein the ATM comprises the non-transitory computer-readable medium storing instructions executable by the processor to, before any prompt to the user for a biometric sample, acquire an image of the user via a camera, and determine that the image has an unacceptable image quality.

18. The ATM of claim 14, wherein the blacklist database is remote to the ATM.

19. The ATM of claim 18, wherein the biometric sample is blacklisted when it is matched in at least one of an agency database, a customer database, and a bank database.

20. A method for improving security in an automated teller machine (ATM) device, the method comprising:
acquiring an image of an ATM user via a camera of the ATM device;
determining an inability to recognize a face of the ATM user in the acquired image;
determining that the user requests a transaction at the ATM device;
prompting the user, via the ATM device, to provide a biometric sample;
receiving, through a biometric sensor of the ATM device, the biometric sample of the ATM user;
evaluating a biometric quality score for the biometric sample;
determining that the biometric quality score passes a predetermined threshold;
determining that the biometric sample is not blacklisted by communicating with a server configured to compare the biometric sample against biometric sample information stored within at least one biometric blacklist database; and
allowing the user to complete the transaction in response to determining that the biometric sample is not blacklisted,
wherein the server is configured to store anonymized event details comprising a location of the transaction, a date and time of the transaction, an amount for the transaction, and the biometric sample, wherein the stored anonymized event details include information different from the user-identifying information associated with the user completing the transaction on the ATM device.

* * * * *